United States Patent [19]

Decelles

[11] Patent Number: 5,288,320
[45] Date of Patent: Feb. 22, 1994

[54] OXIDES AND THE PRODUCTION THEREOF

[75] Inventor: Guy Decelles, Yarm, England

[73] Assignee: Tioxide Group Services Limited, London, United Kingdom

[21] Appl. No.: 814,439

[22] Filed: Dec. 30, 1991

[30] Foreign Application Priority Data

Feb. 2, 1991 [GB] United Kingdom ............... 9102315

[51] Int. Cl.$^5$ .............................................. C09C 1/36
[52] U.S. Cl. ................................... 106/445; 106/447; 106/453; 524/497
[58] Field of Search ................. 406/445, 453, 447; 524/497

[56] References Cited

U.S. PATENT DOCUMENTS

| | | | |
|---|---|---|---|
| 2,479,836 | 8/1949 | Hoback et al. | 106/448 |
| 4,165,239 | 8/1979 | Linden et al. | 406/448 |
| 4,224,080 | 9/1980 | Chambers et al. | 106/439 |
| 4,274,987 | 6/1981 | Augustyn | 524/425 |
| 4,639,272 | 1/1987 | Ito et al. | 106/463 |
| 4,664,711 | 5/1987 | Kawaguchi et al. | 106/445 |
| 4,863,800 | 9/1989 | Miyoshi et al. | 428/403 |

FOREIGN PATENT DOCUMENTS

| | | |
|---|---|---|
| 1467479 | 12/1968 | Fed. Rep. of Germany . |
| 2359885 | 2/1978 | France . |
| 2395296 | 1/1979 | France . |
| 50-75230 | 6/1975 | Japan . |
| 58-43912 | 3/1983 | Japan . |
| 59-62106 | 4/1983 | Japan . |
| 896067 | 5/1962 | United Kingdom . |
| 944292 | 12/1963 | United Kingdom . |
| 1022621 | 3/1966 | United Kingdom . |
| 1037304 | 7/1966 | United Kingdom . |
| 1115334 | 5/1968 | United Kingdom . |
| 1265092 | 3/1972 | United Kingdom . |
| 1266197 | 3/1972 | United Kingdom . |
| 1337501 | 11/1973 | United Kingdom . |
| 1355924 | 6/1974 | United Kingdom . |
| 1587994 | 4/1981 | United Kingdom . |

*Primary Examiner*—Mark L. Bell
*Assistant Examiner*—Scott L. Hertzog
*Attorney, Agent, or Firm*—Baker & Botts

[57] ABSTRACT

Titanium dioxide carries an ester or a partial ester of an hydroxy compound containing 1 to 6 OH groups and an aliphatic saturated $C_{10}$ to $C_{22}$ monocarboxylic acid. The product is easily dispersible in plastics compositions, particularly masterbatches. The titanium dioxide can also be coated with one or more hydrous oxides.

The product is prepared by milling the titanium dioxide in a fluid energy mill in the presence of the ester or partial ester.

17 Claims, No Drawings

OXIDES AND THE PRODUCTION THEREOF

This invention relates to oxides and the production thereof and particularly to titanium dioxide.

According to the present invention an oxide comprises particulate titanium dioxide having on the particles thereof an ester or partial ester of an organic hydroxy compound containing 1 to 6 OH groups and an aliphatic saturated $C_{10}$ to $C_{22}$ monocarboxylic acid.

According to the invention also a method for the production of an oxide comprises subjecting particulate titanium dioxide to milling in a fluid energy mill in the presence of an ester or partial ester of an organic hydroxy compound containing 1 to 6 OH groups and an aliphatic saturated $C_{10}$ to $C_{22}$ monocarboxylic acid.

The invention provides a product which is easily dispersible in plastics compositions such as plastics masterbatches and has advantages over powders not so treated with the ester.

The product can be more quickly incorporated, and thus requires less energy usage during such incorporation, in plastics masterbatches than titanium dioxide which has not been so treated or is added to the plastics masterbatch separately from the ester or partial ester.

The oxide carries an ester of an organic hydroxy compound having 1 to 6 OH groups and both aliphatic or aromatic hydroxy compounds can form the basis of the ester. Typical examples of aliphatic compounds are aliphatic polyols such as ethylene glycol, trimethylol propane, glycerine, hexane triol, erythritol, mannitol, sorbitol and pentaerythritol. Examples of aromatic hydroxy compounds are bisphenol A, hydroquinone and phloroglucinol. Preferably the hydroxy compound is pentaerythritol. Mixtures of different hydroxy compounds can be used.

The esters usable in the present invention are formed by reaction of said hydroxy compound and an aliphatic saturated $C_{10}$ to $C_{22}$ monocarboxylic acid. Mixtures of different acids can be employed. Typical acids are capric acid, undecanoic acid, lauric acid, tridecanoic acid, myristic acid, palmitic acid, margaric acid, stearic acid, and behenic acid. Preferably the acid is myristic acid, palmitic acid or stearic acid.

Mixtures of different esters or partial esters can be employed to treat the particulate titanium dioxide.

The particulate titanium dioxide can also be treated with polyols such as alkanols, or alkanolamines as well as the ester or partial ester. Polyols such as pentaerythritol, trimethylol ethane or trimethylolpropane can be added to the particulate material together with the ester or partial ester or separately therefrom.

The titanium dioxide treated with the ester usually is pigmentary titanium dioxide, but, if desired the titanium dioxide can have a size smaller than that normally associated with the pigmentary form. The titanium dioxide can be either anatase or rutile titanium dioxide but preferably is rutile titanium dioxide. The titanium dioxide can be that obtained from the so-called "sulphate" process or that from the "chloride" process.

The titanium dioxide can also carry a so-called coating of one or more oxides or hydrous oxides of such as, aluminium, titanium, cerium, zirconium, silicon and zinc, or a silicate or a phosphate which has been applied to the particles prior to treatment with the said ester.

Typically hydrous oxides are deposited in a wet process in which the particles of titanium dioxide in the form of an aqueous dispersion are mixed with one or more hydrolysable salts which upon hydrolysis deposit the required hydrous oxide on the particles.

Amounts of oxide or hydrous oxide present as coating can be from 0.5% to 25% by weight as oxide on weight of $TiO_2$ and preferably will be from 0.5% to 10% by weight.

The product of the invention carries the ester in an amount of 0.05% to 1.0% by weight of the product, and preferably from 0.1 to 0.5% by weight.

Treated products in accordance with the invention are produced by subjecting the titanium dioxide to fluid energy milling in the presence of the said ester. The ester can be added directly to the fluid energy mill simultaneously with the titanium dioxide or can be mixed with the powder before milling either in the dry state or in the form of an aqueous dispersion or slurry prior to drying and milling. In the case of solid esters, these, if desired can be melted prior to addition to the powder or can be dissolved in a suitable solvent or formed into an aqueous dispersion prior to addition to the powder or to an aqueous dispersion thereof.

Fluid energy milling can be carried out with steam or other gaseous fluid, e.g. air at an appropriate temperature and pressure to effect the necessary milling of the powder and distribution of the said ester over the surface of the powder.

Typically the milling fluid is introduced into the fluid energy mill at a pressure of from 3 to 25 bars pressure, preferably from 5 to 20 bars. When steam is employed then super heated steam at the appropriate temperature and pressure is employed and temperatures of up to 300° C. can be employed.

The ratio of the weight of milling fluid to the weight of titanium dioxide milled usually is from 0.5:1 to 10.0:1 and the optimum ratio depends on the particular milling conditions and the actual composition or form of the titanium dioxide being milled with steam generally, preferably, ratios in the range 1.5:1 to 3.0:1 are employed.

The use of steam is preferred since other milling fluids may not possess the same energy, weight for weight as does steam.

Milling may be effected in a plurality of milling stages if desired with appropriate adjustments to the quantity of milling fluid used in individual milling stages.

The products of the invention are of value in the preparation of plastics composition or masterbatches. Typically the product can be incorporated in polymers such as polyolefines, polystyrene and ABS melts. The actual amount of the particulate titanium dioxide present in the plastics composition depends on the particular form of the composition. For masterbatches the amount of treated titanium dioxide can be from 50 to 75% of the weight of the composition. Increasing advantages are observed in the speed of incorporation as the amount of pigment is increased.

The invention is illustrated in the following Examples.

EXAMPLE 1

A fine crystal rutile $TiO_2$ pigment having a 1% by weight hydrous alumina coating was subjected to fluid energy milling. The product was passed twice through the mill. Trimethylol propane 0.35% (w:w) was added at the second pass. The total steam to $TiO_2$ weight ratio was approximately 3.4. The treated Product (A) was collected and tested as described below.

A blend of 200 g of Product (A) and 200 g of linear low density polyethylene, (LLDPE Escorene 5101 from ESSO Chemicals), was passed through a 12 mesh sieve. This mix was then passed through a mechanical blender.

The blend was fed into a twin screw extruder: a Haake Rheometer 5000 system with TW100 twin screw attachment. The zones of the twin screw were set at 140° C., 160° C. and 180° C. Measurements were taken of the torque and output (flowrate) of the screw at a revolution of 90 rpm. Additionally, the rpm and output (flowrate) were measured, at a torque of 2000 meter gram.

The results are shown in the Table below. The dispersion of the sample was determined by a blown film test.

EXAMPLE 2

A Product (B) was prepared using the same base pigment as in Example 1 except that in the second pass through the mill 0.17% (w:w) of an ester of pentaerithrytol and a mixture of fatty acids, (predominantly Stearic, Palmitic and Myristic), commercially available as Loxiol EP728 from Henkel Chemicals, was added. This was in addition to the 0.35% (w:w) Trimethylol propane. The treated Product (B) as described in Example 1 was collected and tested.

EXAMPLE 3

This is a repeat of Example 1, but in this Example 0.34 g of the ester, (Loxiol EP 728), was added to the TiO$_2$/LLDPE pre-mix.

The results are shown in the following table.

TABLE

|  | Screw Speed (90 rpm) | | Screw Torque (2000 meter gram) | |
| --- | --- | --- | --- | --- |
|  | Flow Rate (Kg/hr) | Torque (meter gram) | Flow Rate (Kg/hr) | Speed (rpm) |
| Example 1 | 1.30 | 2150 | 1.13 | 83 |
| Example 2 | 1.48 | 1950 | 1.73 | 106 |
| Example 3 | 1.34 | 2080 | 1.25 | 85 |

The dispersion rating of all the samples was excellent.

The results show that Product B (Example 2) when used to produce a masterbatch was easier to incorporate and had a higher flow rate through the screw extruder.

I claim:

1. An oxide comprising particulate titanium dioxide having on the particles thereof an ester or partial ester of pentaerythritol and an aliphatic, unsubstituted C$_{10}$ to C$_{22}$ monocarboxylic acid.

2. An oxide according to claim 1 in which monocarboxylic acid is selected from the class consisting of capric acid, undecanioc acid, stearic acid and behenic acid.

3. An oxide according to claim 1 in which the amount of the ester or partial ester is from 0.05% to 1.0% by weight of the product.

4. An oxide according to claim 1 in which a coating of an oxide or hydrous oxide is also present in an amount of from 0.5% to 25% by weight as oxide on weight of TiO$_2$.

5. An oxide according to claim 1 in which the particles of titanium dioxide carry a polyol in addition to said ester or partial ester.

6. An oxide according to claim 5 in which the polyol is selected from the class consisting of pentaerythritol, trimethylol ethane and trimethylolpropane.

7. A method for the production of an oxide comprising subjecting particulate titanium dioxide to milling in a fluid energy mill in the presence of an ester or partial ester of an organic hydroxy compound containing 1 to 6 OH groups and an aliphatic saturated unsubstituted C$_{10}$ to C$_{22}$ monocarboxylic acid.

8. A method according to claim 7 in which the ester or partial ester is mixed with the said titanium dioxide prior to addition to said mill.

9. A method according to claim 7 in which the ester or partial ester is added to the mill simultaneously with said titanium dioxide.

10. A method according to claim 7 in which a milling fluid at a pressure of from 3 bars to 25 bars is introduced into said mill.

11. A method according to claim 10 in which the ratio of the weight of said milling fluid to the weight of the said titanium dioxide is from 0.5:1 to 10:1.

12. A method according to claim 11 in which the milling fluid is steam.

13. A method according to claim 12 in which the ratio of the weight of steam to weight of titanium dioxide is from 1.5:1 to 3.0:1.

14. The method of claim 7 wherein the organic hydroxy compound is an aliphatic polyol.

15. The method of claim 14 wherein the aliphatic polyol is selected from the group consisting of ethylene glycol, trimethylol propane, glycerine, hexane, erythritol, mannitol, sorbitol and pentaerythritol.

16. The method of claim 7 wherein the organic hydroxy compound is selected from the group consisting of bisphenol A, hydroquinone and phloroglucinol.

17. A plastic composition comprising a mixture of a polymer and an oxide comprising particulate titanium dioxide having on the particles thereof an ester or partial ester of an organic hydroxy compound containing 1 to 6 OH groups and an aliphatic unsubstituted C$_{10}$ to C$_{22}$ monocarboxylic acid.

* * * * *